US012738789B2

United States Patent
(12) United States Patent
Kleinschmidt et al.

(10) Patent No.: US 12,738,789 B2
(45) Date of Patent: Sep. 15, 2026

(54) STATOR ASSEMBLY

(71) Applicant: Caterpillar Inc., Peoria, IL (US)

(72) Inventors: Nathan A Kleinschmidt, Peoria, IL (US); John F. Wikoff, Dunlap, IL (US); Gregory Austin, Peoria, IL (US); Brian R. Janes, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 216 days.

(21) Appl. No.: 18/634,208

(22) Filed: Apr. 12, 2024

(65) Prior Publication Data

US 2025/0323543 A1 Oct. 16, 2025

(51) Int. Cl.

*H02K 3/24* (2006.01)
*H02K 1/14* (2006.01)
*H02K 3/487* (2006.01)
*H02K 15/13* (2025.01)

(52) U.S. Cl.

CPC ............... *H02K 3/24* (2013.01); *H02K 1/146* (2013.01); *H02K 3/487* (2013.01); *H02K 15/13* (2025.01)

(58) Field of Classification Search

CPC .......... H02K 3/24; H02K 1/146; H02K 3/487; H02K 15/13; H02K 9/197
USPC .................................................... 310/65, 214
See application file for complete search history.

(56) References Cited

U.S. PATENT DOCUMENTS 5,140,204 A * 8/1992 Cashmore .............. H02K 9/225 310/214
6,113,024 A * 9/2000 Pittard .................. H02K 3/527 242/433
6,713,927 B2 * 3/2004 Kikuchi .................. H02K 3/24 310/214
6,809,442 B2 * 10/2004 Kaneko ................. H02K 5/128 310/85
7,154,205 B2 12/2006 Yung et al.
8,179,028 B1 5/2012 Rao
10,224,776 B2 3/2019 Buskirk et al.

(Continued)

FOREIGN PATENT DOCUMENTS

CN 219865906 U 10/2023
EP 1494335 B1 4/2007
FR 1454753 A 2/1966

OTHER PUBLICATIONS

Written Opinion and International Search Report for Int'l. Patent Appln. No. PCT/US2025/022682, mailed Jul. 16, 2025 (12 pgs).

*Primary Examiner* — Ahmed Elnakib
(74) *Attorney, Agent, or Firm* — Bookoff McAndrews PLLC

(57) ABSTRACT

A stator assembly including a circumferential stator core with a plurality of stator poles; a plurality of stator slots located between a pair of adjacent stator poles; a plurality of conductive coils surrounding a portion of each stator pole, and a coolant wall assembly. The coolant wall assembly may extend between a pair of adjacent stator poles at a radially inner end of each stator pole, and include a unitary, radially inner wall spanning between, and secured to, the pair of adjacent stator poles on opposing sides of an individual stator slot; a radially outer insert located adjacent the radially inner wall and between the pair of adjacent stator poles; and at least one sealing member positioned radially between the radially outer insert and the plurality of conductive coils.

20 Claims, 7 Drawing Sheets

(56) References Cited

U.S. PATENT DOCUMENTS

| | | | | |
|---|---|---|---|---|
| 2020/0072244 | A1* | 3/2020 | Baumann | H02K 5/203 |
| 2025/0233470 | A1* | 7/2025 | Janes | H02K 1/146 |
| 2025/0323543 | A1* | 10/2025 | Kleinschmidt | H02K 15/13 |

* cited by examiner

STATOR ASSEMBLY

TECHNICAL FIELD

The present disclosure relates generally to a rotary electric machine, and more particularly, to a coolant wall assembly for a stator core.

BACKGROUND

Rotary electric machines may be used to power various components of industrial machines, including propelling mobile industrial machines. Such rotary electric machines, for example, a switched reluctance motor, may generate a significant amount of heat during operation. At present, several different cooling solutions are available, including convection cooling systems in which the generated heat is drawn away from the from the rotary electric machines through the use of cooling fluids, such as oil. Enhancing the cooling systems of the rotary electric machines may result in improving the efficiency of the rotary electric machine, increasing the amount of power generated, and extending the life of the rotary electric machine, thereby decreasing user costs.

A cooling system for a switched reluctance motor is described in U.S. Pat. No. 11,002,289 B2, issued on May 11, 2021 ("the '289 Patent"). The cooling system described in the '289 Patent includes a plurality of cooling channels formed by pairs of adjacent stator coils and a wall extending across each channel. While the cooling system described in the '289 Patent may be helpful in some circumstances, the system may be improved.

Aspects of the present disclosure may solve one or more problems in the art. The scope of the current disclosure, however, is defined by the attached claims, and not by the ability to solve any specific problem.

SUMMARY

In one aspect, a stator assembly including a circumferential stator core. The stator core includes a plurality of stator poles having a length and a width; a plurality of stator slots located between a pair of adjacent stator poles and extending the length of the stator poles; a plurality of conductive coils surrounding a portion of each stator pole; and a coolant wall assembly extending between the pair of adjacent stator poles at a radially inner end of each stator pole. The coolant wall assembly further includes a unitary, radially inner wall and a radially outer insert. The radially inner wall extends the length of the pair of adjacent stator poles and spans between, and is secured to, the pair of adjacent stator poles on opposing sides of an individual stator slot. The radially outer insert is located adjacent the radially inner wall and between the pair of adjacent stator poles, and extends the length of adjacent stator poles.

In another aspect, a stator assembly including a circumferential stator core with a plurality of stator poles having a length and a width; a plurality of stator slots located between a pair of adjacent stator poles and extending the length of the stator poles; a plurality of conductive coils surrounding a portion of each stator pole; and a coolant wall assembly extending between the pair of adjacent stator poles at a radially inner end of each stator pole. The coolant wall assembly includes a unitary, radially inner wall extending the length of the pair of adjacent stator poles and interlocking between the pair of adjacent stator poles on opposing sides of an individual stator slot; a radially outer insert positioned between the pair of adjacent stator poles and extending the length of adjacent stator poles; and at least one sealing member. The at least one sealing member is positioned radially between the radially outer insert and the plurality of conductive coils.

In yet another aspect, a method for installing a coolant wall assembly within a circumferential stator core, the stator core including a plurality of radially inwardly extending stator poles; a plurality of stator slots located between adjacent stator poles; a plurality of conductive coils surrounding a portion of each stator pole; and the coolant wall assembly extending between radially inner ends of the adjacent stator poles. The coolant wall assembly includes a radially outer insert, a unitary, radially inner wall, and a pair of sealing members, each extending the length of the adjacent stator poles. The installation method includes inserting the radially outer insert into an individual stator slot, such that an individual sealing member of the pair of sealing members is positioned between an individual conductive coil on each adjacent stator pole and a radially outer surface receiving portion of the radially outer insert; compressing the pair of sealing members radially outwardly within the stator slot by applying a radially outward force to the radially outer insert; and inserting the radially inner wall within a recessed groove of each of the adjacent stator poles to secure the coolant wall assembly.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Both the foregoing general description and the following detailed description are exemplary and explanatory only and are not restrictive of the features, as claimed. As used herein, the terms "comprises," "comprising," "has," "having," "includes," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, unless stated otherwise, relative terms, such as, for example, "about," "substantially," and "approximately" are used to indicate a possible variation of +10% in the stated value.

Figure 1A:
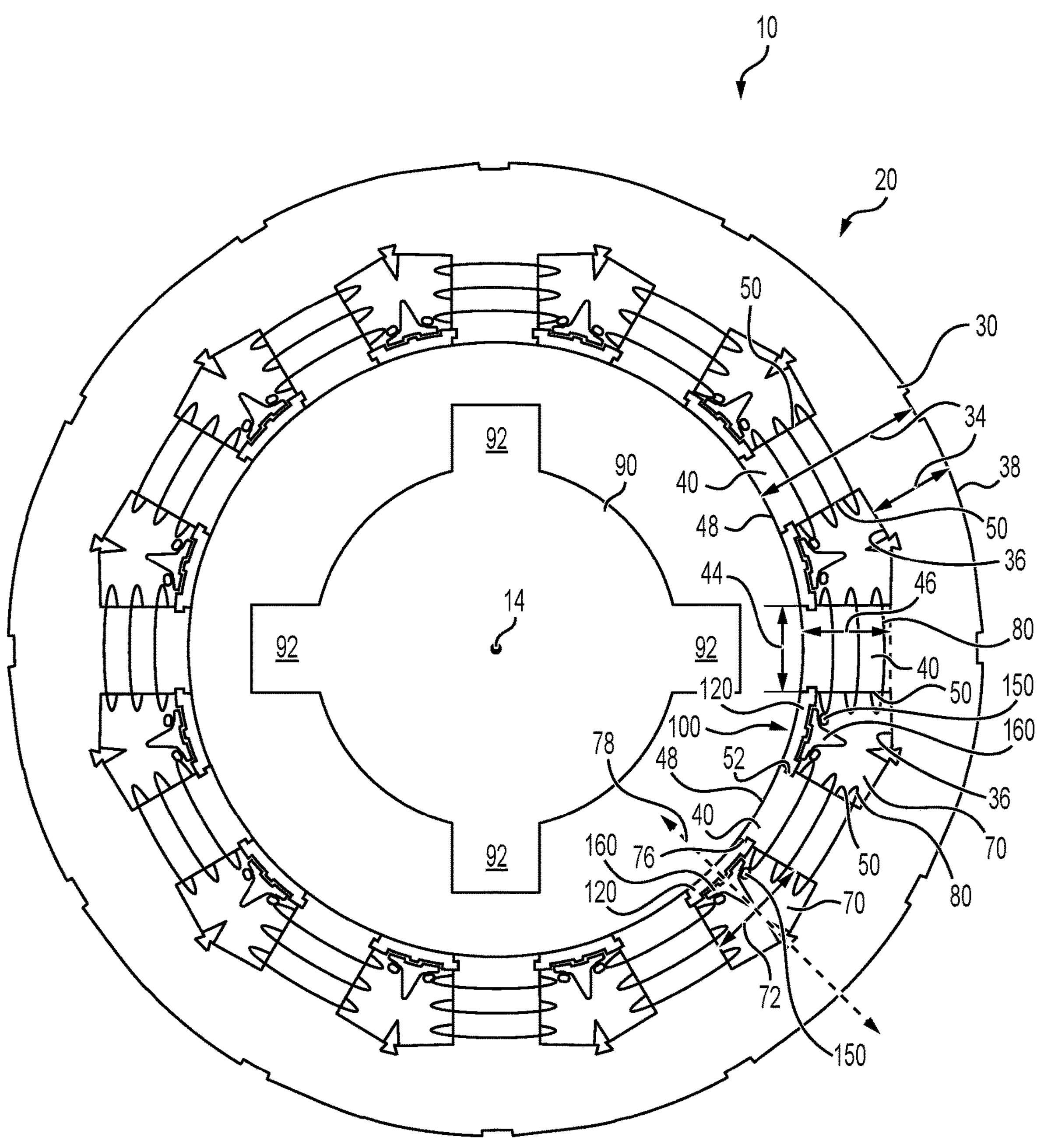
FIG. 1A is a schematic end view of a portion of a rotary electric machine, according to aspects of the disclosure.
Figure 1B:
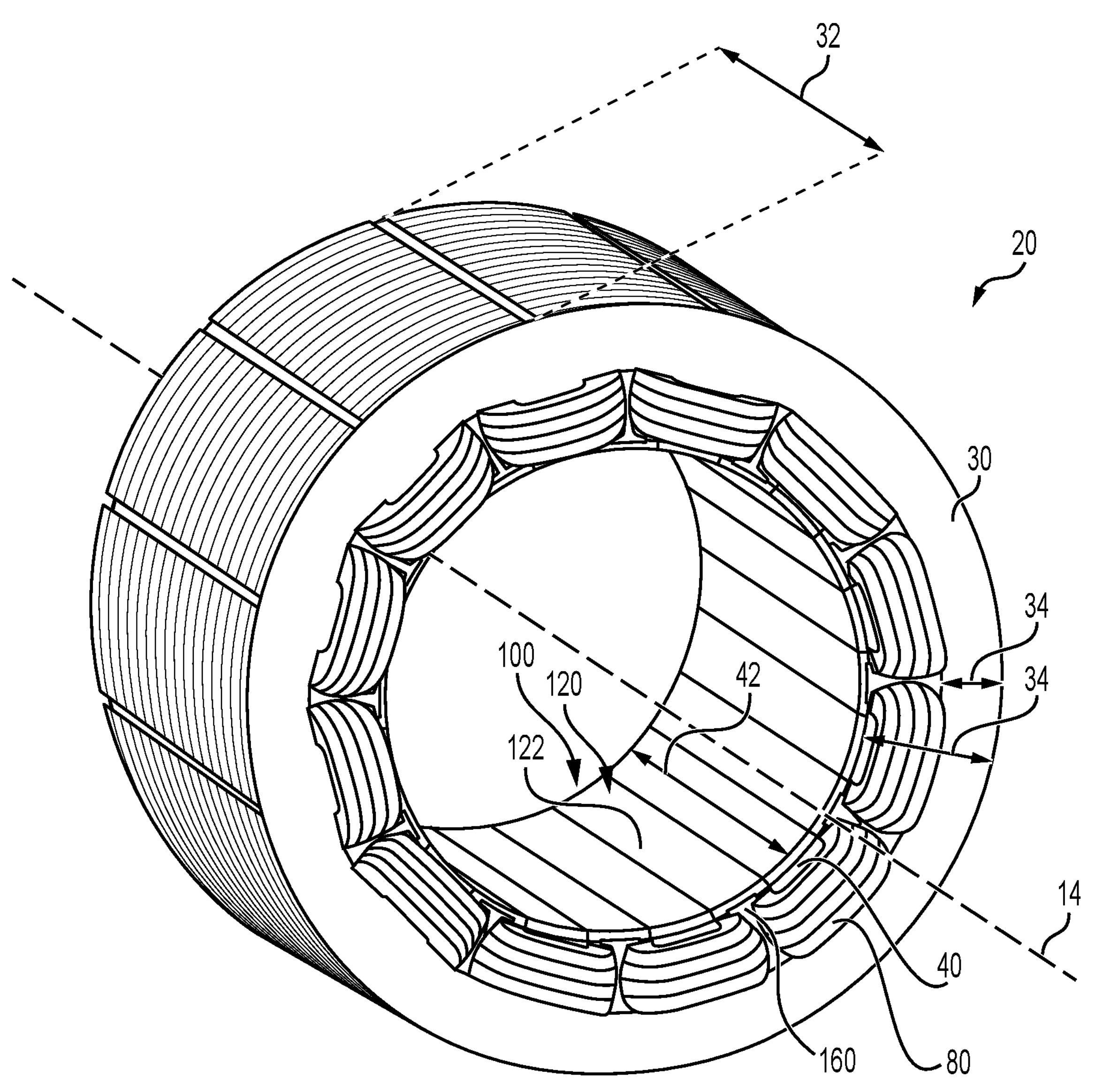
FIG. 1B is a perspective view of a stator of the rotary electric machine of FIG. 1A.

FIGS. 1A and 1B depict a rotary electric machine in the form of a switched reluctance motor 10 that includes a circumferential stator 20, and a rotor 90 that is rotatable relative to the stator 20. Stator 20 includes a circumferential stator core 30, a plurality of radially inwardly extending stator poles 40, and a plurality of conductive coils 80 surrounding at least a portion of each stator pole 40. The stator 20 also includes a plurality of stator slots or channels 70 extending between pairs of adjacent stator poles 40, and a coolant wall assembly 100 extending across a radially inner opening 76 of each of the stator slots 70. As will be explained in more detail below, the coolant wall assembly 100 includes a radially outer wedge insert 160, at least one sealing member 150, and a radially inner wall 120.

The stator core 30 includes a length 32 (FIG. 1B) that extends parallel to a longitudinal axis 14 of the switched reluctance motor 10, and has a varying radial thickness 34 which is based on the point of measurement relative to the plurality of radially inwardly extending stator poles 40. For example, as shown in FIG. 1A, the varying radial thickness 34 may be measured to include a thickness of the stator core 30 as measured from a radially inner surface 36 to a radially outer surface 38, or the measurement may include the thickness of an individual stator pole 40. Similarly, the rotor 90 includes a plurality of radially outwardly projecting rotor poles 92. The number of phases of the switched reluctance motor 10, as well as the number of stator poles 40 and rotor poles 92, is exemplary only and not intended to be limiting. Furthermore, as shown in FIG. 1B, the stator core 30 may be formed of a stack of vertically laminated annular members made of an iron alloy or other similar material.

Each stator pole 40 projects radially inward towards the central longitudinal axis 14 of the switched reluctance motor 10 (FIG. 1A), with each stator pole 40 including a radially inner end 48 and a pair of opposing sidewalls 50. The stator poles 40 each include a length 42 (FIG. 1B) that extends parallel to the central longitudinal axis 14 of the switched reluctance motor 10, and a height 46 that extends radially inward (towards the central longitudinal axis 14) from a radially inner surface 36 of the stator core 30. Each of the stator poles 40 also includes a constant width 44 (FIG. 1A) that extends between the opposing sidewalls 50 (i.e., a first sidewall and a second sidewall) of the stator pole 40, with the constant width 44 being generally uniform along the entire height 46 of each individual stator pole 40.

The stator slots 70 of the stator core 30 are angularly positioned between a pair of adjacent stator poles 40 (FIG. 1A), such that the number of stator slots 70 is equal in number to the number of stator poles 40. Like the stator poles 40, the stator slots 70 have a length that extends parallel to the longitudinal axis 14 of the switched reluctance motor 10, and is the same or approximately the same length as the length 42 of stator poles 40. Each stator slot 70 is bounded by the pair of opposing sidewalls 50 of the pair of adjacent stator poles 40 and by a radially outer wall 74 (FIG. 2A) formed by the radially inner surface 36 of the stator core 30. As shown in FIG. 1A, each of the stator slots 70 include a radially inner opening 76 (best shown in FIG. 4A), with the opening 76 being located at the radially inner end 48 of the stator poles 40 such that the opening 76 is facing radially inward towards the rotor 90. Due to the circular cross-section shape of the stator 20 and the generally constant width 44 of each stator pole 40, each stator slot 70 includes a tapering width 72 that narrows in a generally uniform or linear manner from the radially inner surface 36 of the stator core 30 towards the radially inner opening 76 of the stator slot 70. A centerline 78 of each stator slot 70 extends radially through the stator slot 70 between the adjacent pairs of stator poles 40.

As noted above and depicted in FIGS. 1A and 1B, each stator pole 40 includes a conductive winding or coil 80 that is wrapped around the stator poles 40. As shown in more detail in FIG. 2A, a majority of the stator slot 70 is filled by conductive coils 80. The conductive coils 80 are positioned about the stator poles 40 of each group of a phase set (i.e., A+, A− and B+, B−), which are electrically connected and may be configured as part of an electrical circuit, either in parallel or in series. While the conductive coils 80 extend a majority of the height 46 of the stator pole 40, they do not extend all the way to the radially inner end 48 of the stator pole 40, so as to leave room for coupling the coolant wall assembly 100 to the radially inner opening 76, as will be explained in more detail below.

The rotor 90 of the switched reluctance motor 10 does not include windings or magnets. The rotor 90 may be formed of a stack of vertically laminated, annular members (not shown) similar to rotor core 30. Rotor 90 may have additional or alternative structures and/or configurations. In addition, while the rotary electric machine of FIG. 1A is depicted as a switched reluctance motor 10, the concepts disclosed herein are applicable to other rotary electric machines, such as a switched reluctance generator, or a machine with a rotor 90 having permanent magnets or some other structure or configuration.

Figure 2A:
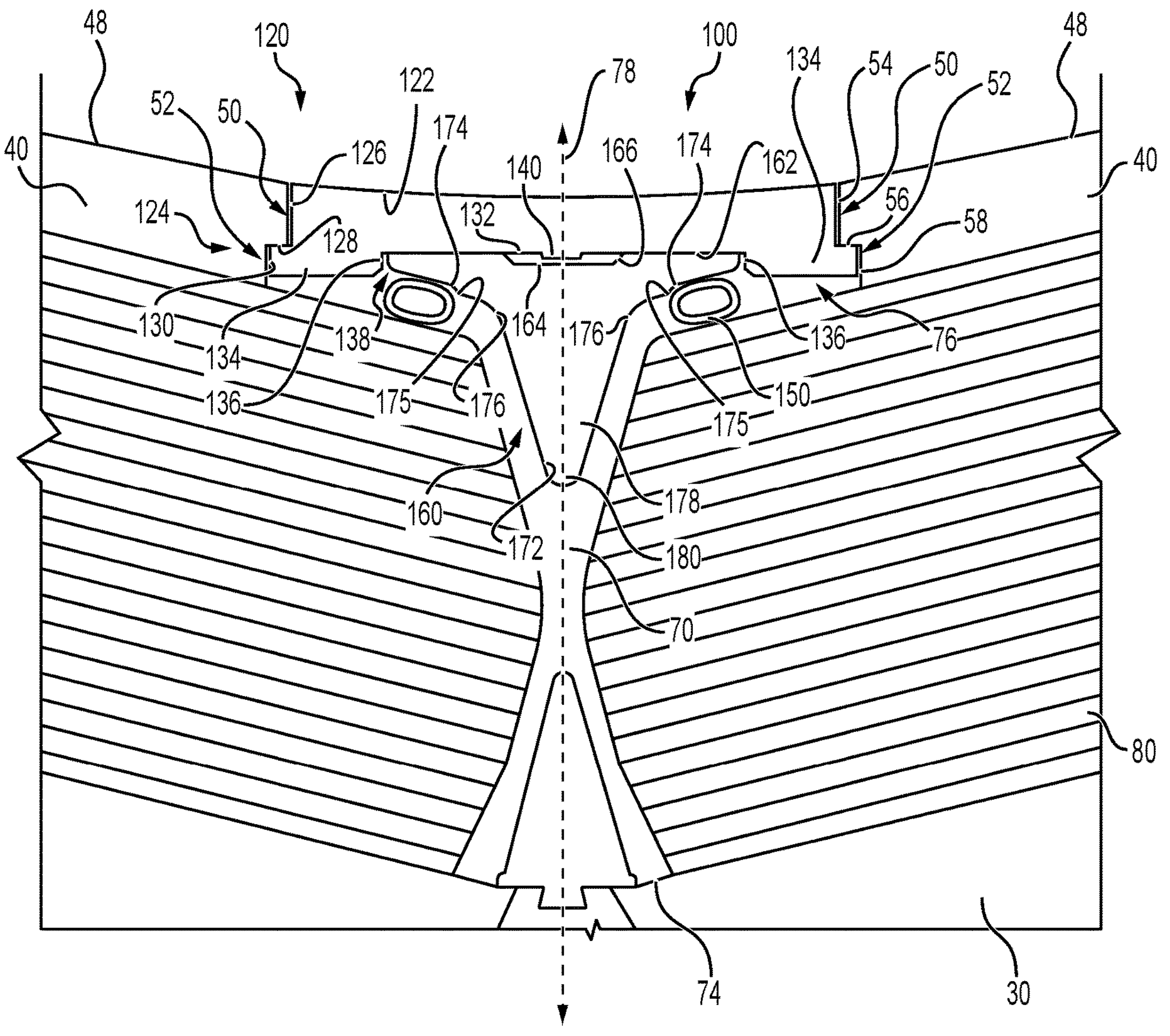
FIG. 2A is an end view of a coolant wall assembly of the stator of the rotary electric machine of FIG. 1.

Referring to FIG. 2A, each of the stator poles 40 include a retention feature located on each opposing sidewall 50 of stator pole 40. For example, the retention feature in FIG. 2A is a recessed groove 52 that extends lengthwise along each of the opposing sidewalls 50 of the stator pole 40. As shown in FIG. 2A, the recessed grooves 52 are adjacent to and spaced radially-outward from the radially inner end 48 of the stator pole 40, and spaced radially-inward from a corresponding conductive coil 80 located on the stator pole 40. Each of the recessed grooves 52 open towards the empty space of the stator slot 70 and includes a substantially stepped shape. For example, the recessed grooves 52 include a radially inner planar wall 54, a radially outer ledge or step 56 extending perpendicular to the radially inner planar wall 54, and a radially outer planar wall 58 extending perpendicular to the radially outer ledge 56 and substantially parallel to the radially inner planar wall 54.

In the assembled configuration of FIG. 2A, the coolant wall assembly 100 extends between the pair of adjacent stator poles 40 (at the radially inert end 48) and spans across the radially inner opening 76 of each of stator slots 70. The coolant wall assembly 100 forms a barrier structure that includes the radially inner wall 120 (shown individually in FIG. 2B), a radially outer wedge insert 160 and a pair of sealing members 150 (shown individually in FIG. 2C). When assembled, the coolant wall assembly 100 extends along the length 32 of the stator core 30, specifically the length 42 the stator poles 40. It should be noted that the radially inner wall 120 and the radially outer wedge insert 160 may be formed of a thermally and/or electrically insulative material, such as plastic or resin, or any other appropriate material.

Figure 2B:
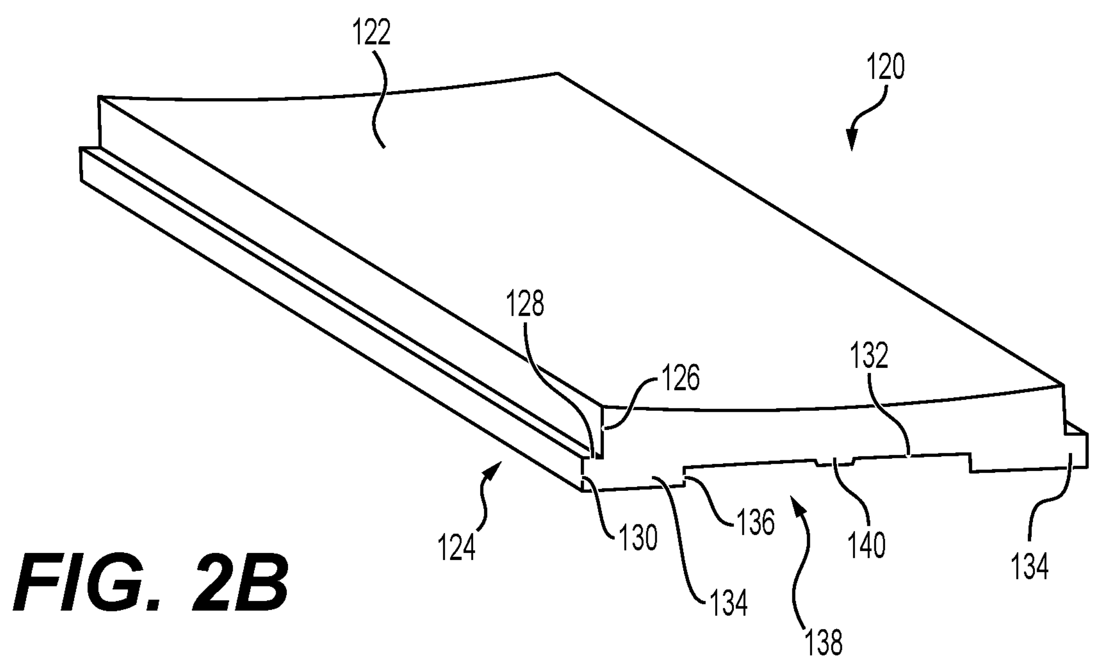
FIG. 2B is a perspective view of an upper wedge of the coolant wall assembly of FIG. 2A.

Turning to FIG. 2B, the radially inner wall 120 is a unitary structure and includes a radially inner face 122, a radially outer face 132, and a pair of stepped sidewall surfaces 124 extending therebetween. The radially inner surface 122 forms a generally planar or slightly concave surface that is substantially coextensive with the radially inner ends 48 of stator poles 40. The stepped side surfaces 124 are configured to be received in the recessed grooves 52 of the stator poles 40, and each stepped side surface 124 include(s) a radially inner planar sidewall 126, a radially inner step 128, and a radially outer planar sidewall 130. The radially inner step 128 is generally perpendicular to both the radially inner planar sidewall 126 and the radially outer planar sidewall 130, which are substantially parallel to each other. The radially outer face 132 of the radially inner wall 120 includes a centering, recessed channel or groove 138 including a medial protrusion 140, and a pair of radially outer winged portions 134. As shown in FIGS. 2A and 2B, the medial protrusion 140 extends radially outwardly from the radially outer face 132 of the radially inner wall 120 (towards a radially inner surface 36 of the stator core 30) and substantially aligns with a centerline 78 (FIG. 2A) of the individual stator slot 70. The pair of radially outer winged portions 134 extend radially and circumferentially outward from the radially outer face 132, defining the outer bounds of the centering, recessed channel or groove 138 (via a pair of planar sidewalls 136) and terminating in the radially outer planar sidewall 130. When the coolant wall assembly 100 is engaged within the stator core 30, the pair of radially inner steps 128 of the radially inner wall 120 correspond with the pair of radially outer ledges or steps 56 of the recessed grooves 52, forming a mechanical engagement or securement between the opposing sidewalls 50 of the pair of adjacent stator poles 40, so as to restrict the radially inner wall 120 from moving radially inwardly toward the rotor 90.

Figure 2C:
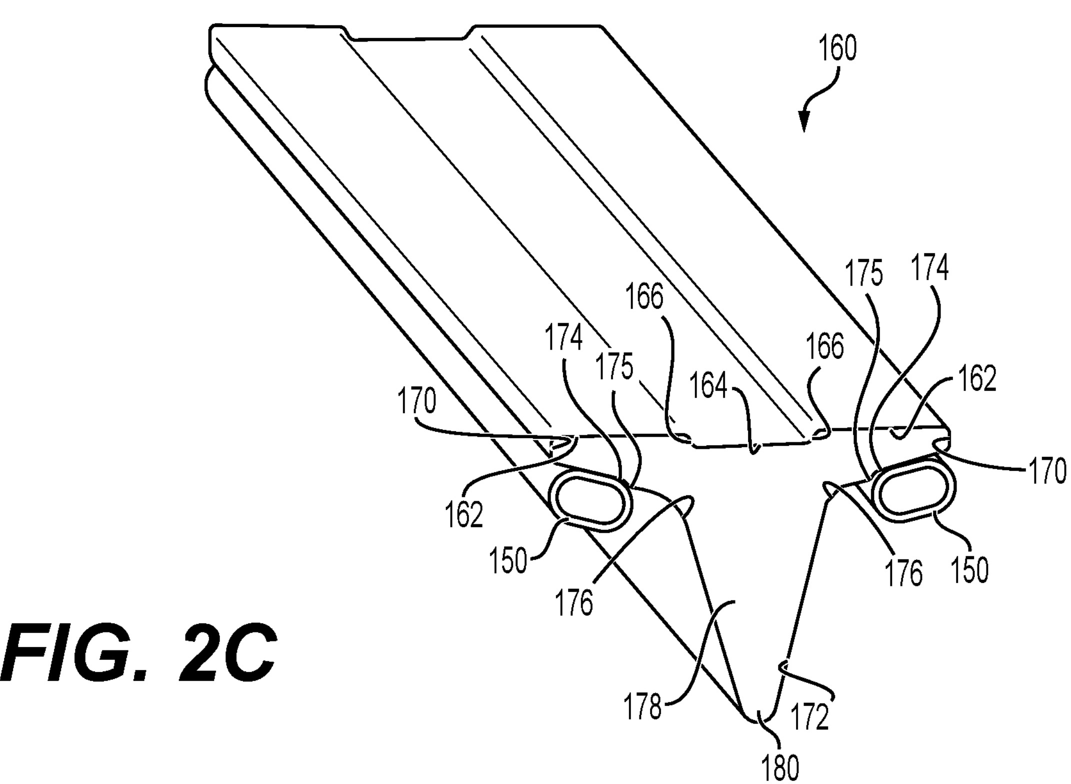
FIG. 2C is a partial perspective view of a lower edge of the coolant wall assembly of FIG. 2A.

The radially outer wedge insert 160, as shown in FIGS. 2A and 2C, is located adjacent to and radially outward from the radially inner wall 120 within the stator slot 70. The radially outer wedge insert 160 is shaped like a downwardly pointing, winged triangle and includes a radially inner face 162 with a recessed channel or groove 164 and a central tapered portion 178 that extends radially outward. As shown in FIG. 2A, the radially inner face 162 of the radially outer wedge insert 160 abuts the radially outer face 132 of the radially inner wall 120. More specifically, the radially inner face 162 of the radially outer wedge insert 160 is retained within the recessed channel or groove 138 of the radially inner wall 120 and is bounded by the pair of radially outer winged portions 134. The recessed channel 164 of the radially outer wedge insert 160 includes sidewalls 166 and is generally aligned with the medial protrusion 140 of the radially inner wall 120 and the centerline 78 of the stator slot 70, such that the medial protrusion 140 is positioned within the recessed channel 164. As shown in FIG. 2A, radially outer wedge insert 160 does not contact the stator poles 40.

Extending from the radially inner face 162, the radially outer wedge insert 160 includes a pair of circumferential receiving portions 174 with sidewalls 170 located on either side of the centerline 78. The pair of circumferential receiving portions 174 are configured to provide a stable and substantially planar surface on a radially outer side of the radially outer wedge insert 160 for adherence to one or more sealing members 150. Transitioning on from the circumferential receiving portions or wings 174, the radially outer wedge insert 160 also includes a pair of filleted or rounded comers 176 that develop into to the central tapering portion or triangle portion 178 with sidewalls 172. The central tapering portion 178 further extends or tapers radially outward in the stator slot 70 and terminates in a radially outward apex 180. The radially outward apex 180 of the radially outer wedge insert 160 protrudes radially outward into the individual stator slot 70, towards the radially inner surface 36 of the stator core 30.

Shown in exemplary FIGS. 2A and 2C, the pair of sealing members 150 are located radially between the radially outer surfaces of the pair of circumferential receiving portions 174 of the radially outer wedge insert 160 and a pair of conductive coils 80 located on the pair of adjacent stator poles 40. Stated another way, the pair of sealing members 150 enable the radially outer wedge insert 160 to be biased against the conductive coils 80 and providing for a fixed location of the radially outer wedge insert 160. The one or more sealing members 150 may be two linear sealing members 150 extending parallel to one another and substantially the full length 42 of the stator core 30, or could be a single sealing member 150 wrapped around the central tapering portion 178. Sealing members 150 may be glued or otherwise adhered to the circumferential receiving portions 174, with the sealing members 150 being bounded by a locating ridge 175 located between the circumferential receiving portions 174 and the filleted corners 176. The sealing members 150 may be made of a resilient or elastomeric material, such as a fluorocarbon rubber or any other appropriate material. By using resilient materials in the sealing members 150, the pair of sealing members 150 are able to slightly compress and provide a mechanical bias in a radially inwardly direction to form the mechanical interlock to secure the coolant wall assembly 100 in place against recessed grooves 52. It should be noted that while the sealing members 150 are shown to include a hollow cross-section, the sealing member 150 may have an alternative shape (e.g., a solid strip of sealing material, and/or a non-circular cross-section), may be formed of a different material, and may include fewer or additional sealing members.

INDUSTRIAL APPLICABILITY

The disclosed aspects of the coolant wall assembly 100 for the stator 20 of the present disclosure may be used to assist the cooling of electric rotary machines, such as motors or generators. In particular, the coolant wall assembly 100 may assist in cooling a rotary machine by maintaining cooling fluid within stator slots 70 of a stator 20 of a switched reluctance motor 10.

Figure 3:
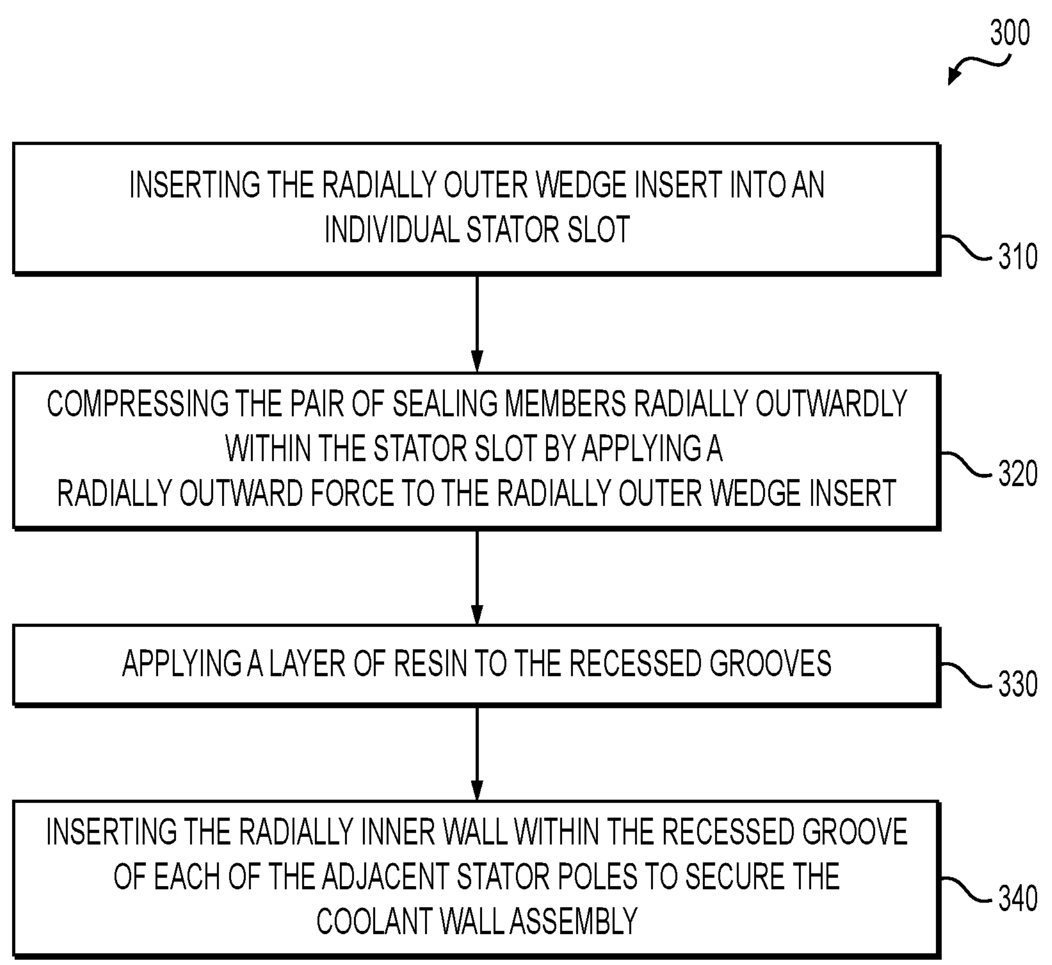
FIG. 3 provides a flowchart depicting an exemplary method for installing a coolant wall assembly into a stator slot of the rotary electric machine of FIG. 1A.
Figure 4A:
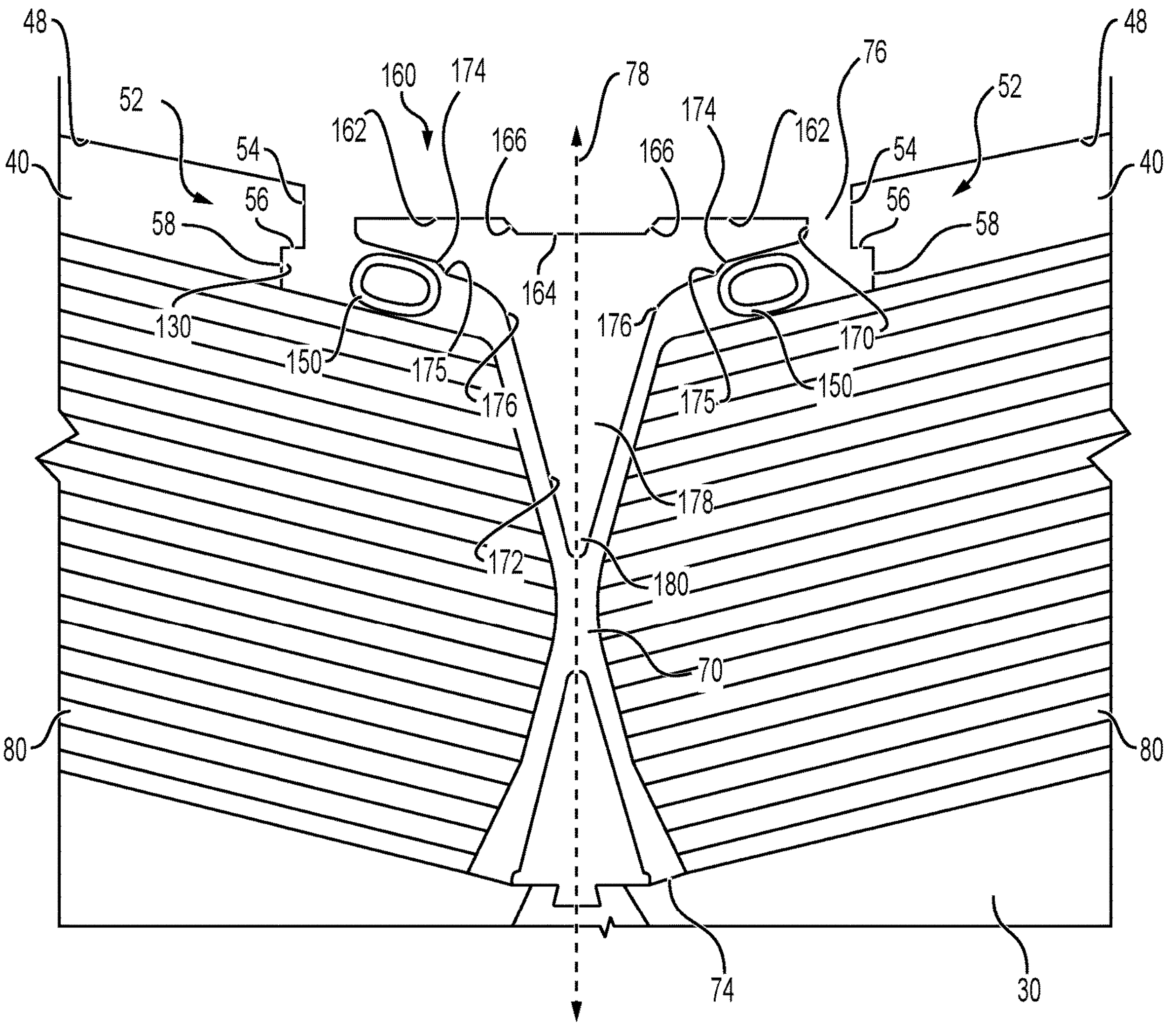
FIGS. 4A-4B depict the insertion of the coolant wall assembly into a stator of the rotary electric machine of FIG. 1A.
Figure 4B:
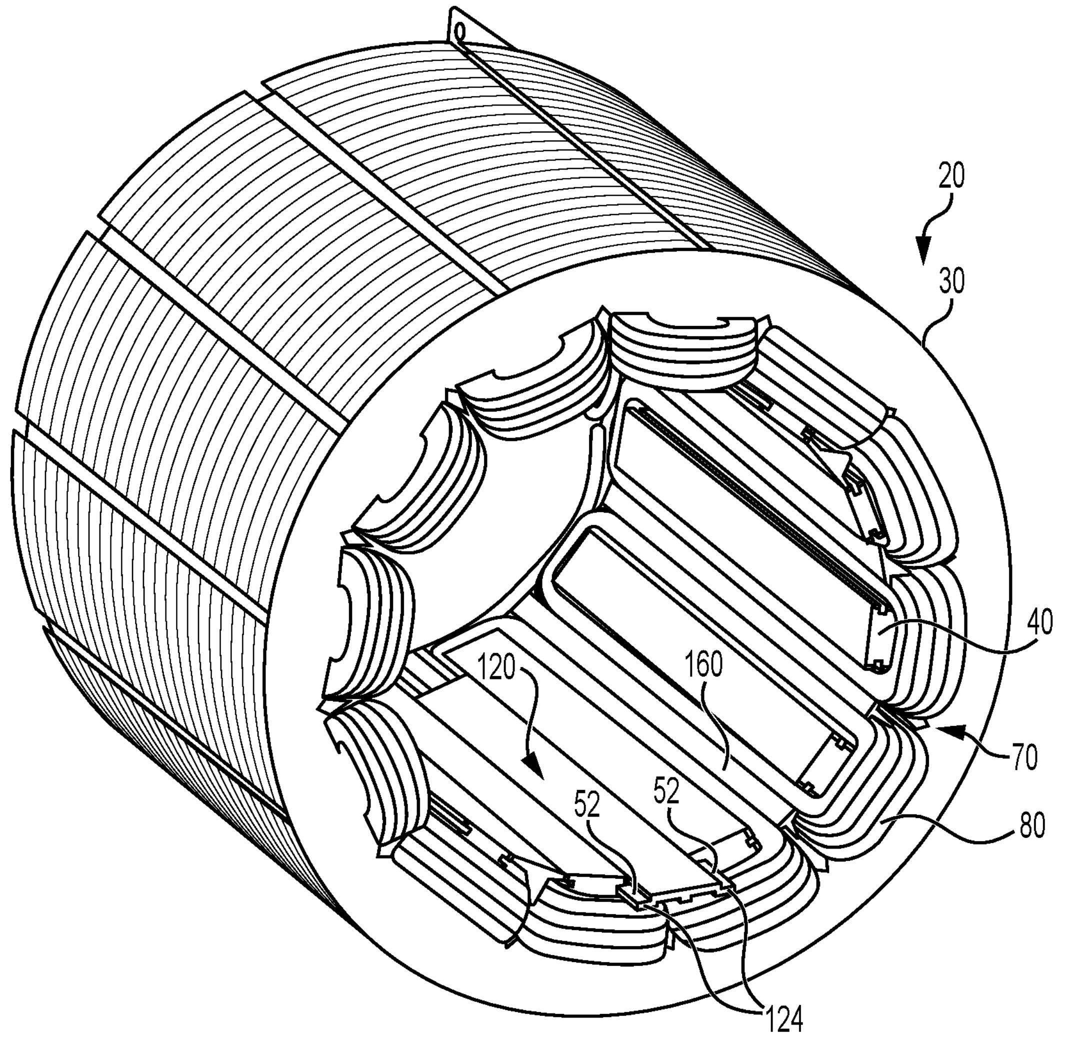

FIG. 3 illustrates an example method 300 for installing a coolant wall assembly 100, including the radially inner wall 120, the radially outer wedge insert 160, and the pair of sealing members 150, into a plurality of stator slots 70 between a plurality of stator poles 40 within rotary electric machine 10. FIGS. 4A-4B structurally depict the implementation of the method of FIG. 3. FIG. 4A shows the stator core 30 prior to insertion of the radially inner wall 120. The method 300 includes a step 310 of inserting the radially outer wedge insert 160 with adhered sealing members 150 into an individual stator slot 70 so that the assembly contacts a pair of conductive coils 80 located on a pair of adjacent stator poles 40. More specifically, a pair of sealing members 150 are positioned between a pair of circumferential receiving portions or wings 174 of the radially outer wedge insert 160 and the pair of conductive coils 80, such that the radially outer wedge insert 160 is centrally located between a pair of opposing sidewalls 50 of a pair of adjacent stator poles 40.

Step 320 of the method 300 involves compressing the pair of sealing members 150 radially outwardly within the individual stator slot 70, such a radially outward force is applied to the radially outer wedge insert 160. The application of the radially outward force results in the radially outer wedge insert 160 being pushed radially outward towards the pair of conductive coils 80. A byproduct of this step of compression and the resilient nature of the pair of sealing members 150 is that the sealing members 150 will generate a mechanical bias by seeking to return to their original position and size. The compressing step may be achieved manually during manufacturing by pushing the radially outer wedge insert 160 radially outwardly, or may be achieved during step 340 and the inserting of the radially inner wall 120.

In step 340 of the method 300, the radially inner wall 120 is inserted or slid into a pair of recessed groves 52 formed in the opposing sidewalls 50 of the pair of adjacent stator poles 40, as shown in FIG. 4B. The radially inner wall 120, which is shaped to be received between the pair of recessed grooves 52, forms a mechanical connection between its pair of stepped side surfaces 124 and the corresponding stepped configuration of the recessed grooves 52 due, the connection being biased radially inwardly by the compressed sealing members 150. For example, as shown in FIGS. 2A and 4B, the radially inner wall 120 includes a pair of radially inner steps 128 that corresponds to a pair of radially outer ledges 56 of the recessed grooves 52. Once inserted, the pair of sealing members 150 provide a retention force in a radially inward direction and a friction force that restricts sliding movement, thereby securing the radially inner wall 120 in place within the pair of recessed grooves 52. The radially inner wall 120 may be inserted into the recessed grooves 52 either manually or with the aid of an appropriate tool. As an optional step 330 of the method 300, additional sealing may be provided by including a layer of resin or adhesive applied to the recessed grooves 52 prior to the step of inserting the radially inner wall 120.

In accordance with the present disclosure, the coolant wall assembly 100 of the stator 20 may facilitate the function of a rotary electric machine by providing a coolant wall assembly 100 that facilitates a positive seal for containing cooling oil utilized within the stator 20. Further, by providing the radially outer wedge insert 160 and seals directly into the stator slot 70, the assembly provides a system that helps maintain coolant within the stator slot 70, and facilitates proper coolant velocity within the stator slot 70. Further, such an assembly provides for ease of assembly while providing appropriate sealing.

It will be apparent to those skilled in the art that various modifications and variations can be made to the disclosed system without departing from the scope of the disclosure. Other embodiments of the system will be apparent to those skilled in the art from consideration of the specification and practice of the system disclosed herein. It is intended that the specification and examples be considered as exemplary only, with a true scope of the disclosure being indicated by the following claims and their equivalents.

What is claimed is:

1. A stator assembly, comprising:
a circumferential stator core including:
a plurality of stator poles having a length and a width;
a plurality of stator slots, each stator slot being located between a respective pair of adjacent stator poles and extending the length of the stator poles;
a plurality of conductive coils, each conductive coil surrounding a portion of a respective stator pole; and
a coolant wall assembly extending between a pair of adjacent stator poles at a radially inner end of each stator pole, the coolant wall assembly including:
a unitary, radially inner wall extending the length of the pair of adjacent stator poles and spanning between, and secured to, the pair of adjacent stator poles on opposing sides of an individual stator slot;
a radially outer insert located adjacent the radially inner wall and between the pair of adjacent stator poles, and extending the length of adjacent stator poles; and
at least one sealing member positioned radially between the radially outer insert and at least one of the plurality of conductive coils.

2. The stator assembly of claim 1, wherein each of the pair of adjacent stator poles includes a radially inner wall retention feature.

3. The stator assembly of claim 2, wherein the retention feature includes a recessed grove, wherein the recessed grove is spaced radially outward from a radially innermost end of the stator pole.

4. The stator assembly of claim 3, wherein the radially inner wall includes a radially inner face, a radially outer face, and a pair of stepped side surfaces.

5. The stator assembly of claim 4, wherein each of the pair of stepped side surfaces of the radially inner wall are configured to be received in the recessed grooves of the stator poles.

6. The stator assembly of claim 5, wherein the at least one sealing member includes two sealing members extending the length of the stator poles and biasing the radially outer insert and radially inner wall in a radially inward direction.

7. The stator assembly of claim 2, wherein the at least one sealing member is configured to bias the radially outer insert and the radially inner wall in a radially inward direction against the radially inner wall retention features of the adjacent stator poles.

8. The stator assembly of claim 1, wherein the radially outer insert is received within a channel formed in the radially inner wall, wherein the radially outer insert includes a tapering portion tapering in a radially outward direction.

9. The stator assembly of claim 8, wherein the radially outer insert includes a radially inner face having a recessed channel and the radially inner wall includes a medial protrusion extending outward from a radially outer face of the radially inner wall, and the medial protrusion is positioned within the recessed channel of the radially outer insert.

10. The stator assembly of claim 1, wherein the radially inner wall and radially outer insert are both formed of a thermally and/or electrically insulative material.

11. A stator assembly, comprising:
a circumferential stator core including:
a plurality of stator poles having a length and a width;
a plurality of stator slots, each stator slot being located between a respective pair of adjacent stator poles and extending the length of the stator poles;
a plurality of conductive coils, each conductive coil surrounding a portion of a respective stator pole; and
a coolant wall assembly extending between a pair of adjacent stator poles at a radially inner end of each stator pole, the coolant wall assembly including:
a unitary, radially inner wall extending the length of the pair of adjacent stator poles and interlocking between the pair of adjacent stator poles on opposing sides of an individual stator slot;
a radially outer insert positioned between the pair of adjacent stator poles and extending the length of adjacent stator poles; and
at least one sealing member, wherein the at least one sealing member is positioned radially between the radially outer insert and at least one of the plurality of conductive coils.

12. The stator assembly of claim 11, wherein each of the pair of adjacent stator poles include an opposing sidewall with a recessed groove spaced radially outward from a radially innermost end of the stator pole.

13. The stator assembly of claim 12, wherein the radially inner wall and the radially outer insert are both formed of a thermally and/or electrically insulative material.

14. The stator assembly of claim 13, wherein the radially inner wall including a radially inner face, a radially outer face, and a pair of stepped side surfaces.

15. The stator assembly of claim 14, wherein each of the pair of stepped side surfaces of the radially inner wall are configured to be received in the recessed grooves of the stator poles.

16. The stator assembly of claim 15, wherein the at least one sealing member includes two sealing members extending the length of the stator poles and biasing the radially outer insert and radially inner wall in a radially inward direction.

17. The stator assembly of claim 11, wherein the radially outer insert includes a tapering portion tapering in a radially outward direction.

18. The stator assembly of claim 17, wherein the radially outer insert is received within a channel formed in the radially inner wall.

19. The stator assembly of claim 11, wherein the radially outer insert includes a radially inner face having a recessed channel and the radially inner wall includes a medial protrusion extending outward from a radially outer face of the radially inner wall, and the medial protrusion is positioned within the recessed channel of the radially outer insert.

20. A method for installing a coolant wall assembly within a circumferential stator core, the stator core including a plurality of radially inwardly extending stator poles; a plurality of stator slots located between adjacent stator poles and extending a length of the stator poles; a plurality of conductive coils, each conductive coil surrounding a portion of a respective stator pole; and the coolant wall assembly extending between radially inner ends of adjacent stator poles, wherein the coolant wall assembly includes a radially outer insert, a unitary, radially inner wall, and a pair of sealing members, each extending the length of the adjacent stator poles, the method comprising:

inserting the radially outer insert into an individual stator slot, such that an individual sealing member of the pair of sealing members is positioned between an individual conductive coil on each adjacent stator pole and a radially outer surface receiving portion of the radially outer insert;

compressing the pair of sealing members radially outwardly within the stator slot by applying a radially outward force to the radially outer insert; and inserting the radially inner wall within a recessed groove of each of the adjacent stator poles to secure the coolant wall assembly.

* * * * *